(12) United States Patent (10) Patent No.: US 12,607,045 B2

Konga (45) Date of Patent: Apr. 21, 2026

(54) ACOUSTIC IMPROVEMENTS IN VEHICLE USING ELECTROMAGNETICALLY LATCHED LIFTGATE

(71) Applicant: GM Global Technology Operations LLC, Detroit, MI (US)

(72) Inventor: Murali K. Konga, Bengaluru (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 556 days.

(21) Appl. No.: 18/166,742

(22) Filed: Feb. 9, 2023

(65) Prior Publication Data

US 2024/0271467 A1 Aug. 15, 2024

(51) Int. Cl.
| | |
|---|---|
| *E05B 81/08* | (2014.01) |
| *B60J 5/10* | (2006.01) |
| *E05B 77/12* | (2014.01) |
| *E05B 83/16* | (2014.01) |
| *E05B 77/54* | (2014.01) |
| *E05B 81/56* | (2014.01) |

(52) U.S. Cl.
CPC .............. *E05B 81/08* (2013.01); *B60J 5/101* (2013.01); *E05B 77/12* (2013.01); *E05B 83/16* (2013.01); *E05B 77/54* (2013.01); *E05B 81/56* (2013.01); *E05Y 2600/40* (2013.01); *E05Y 2900/532* (2013.01)

(58) Field of Classification Search
CPC .......... E05B 81/08; E05B 77/12; E05B 77/04; E05B 77/54; E05B 77/36; E05B 83/16; E05B 83/18; E05B 79/04; E05B 47/0003; E05B 63/0008; E05Y 2900/532; B60J 5/10; B60J 5/101; B60J 5/107

USPC ......... 296/202, 56, 146.4, 146.8; 292/251.5; 180/281; 70/241, 277
See application file for complete search history.

(56) References Cited

U.S. PATENT DOCUMENTS

| | | | |
|---|---|---|---|
| 11,554,647 B1* | 1/2023 | Faruque ................. | B60J 5/0479 |
| 2002/0027365 A1* | 3/2002 | Rogers, Jr. ............. | E05B 81/20 |
| | | | 292/201 |
| 2013/0031837 A1* | 2/2013 | Charnesky ............. | B60J 5/0479 |
| | | | 49/31 |
| 2022/0106815 A1* | 4/2022 | Stojc ....................... | E05B 81/28 |
| 2023/0114112 A1* | 4/2023 | Sobecki ................. | E05B 81/58 |
| | | | 292/336.3 |

(Continued)

FOREIGN PATENT DOCUMENTS

| | | | | |
|---|---|---|---|---|
| CN | 118288748 A | * | 7/2024 | ................ E05F 5/06 |
| CN | 119099305 A | * | 12/2024 | ......... B60R 16/0232 |

(Continued)

OTHER PUBLICATIONS

Hyvon (FR 2942177 A1), machine translation (Year: 2010).*
Cho et al. (KR 102111495 B1), machine translation (Year: 2020).*
Seidl (DE 102017221460 A1), machine translation (Year: 2019).*

*Primary Examiner* — Amy R Weisberg
*Assistant Examiner* — Wenwei Zhuo
(74) *Attorney, Agent, or Firm* — CANTOR COLBURN LLP

(57) ABSTRACT

An in vehicle noise improvement system includes a liftgate hingedly attached and mechanically latched to a body structure in a closed position. At least one selectively energized electromagnetic latch reduces liftgate induced structure borne noise by constraining liftgate displacements under vehicle running condition.

20 Claims, 3 Drawing Sheets

(56) References Cited

U.S. PATENT DOCUMENTS

| 2024/0218711 A1* | 7/2024 | Trivedi | ................... E05C 19/16 |
| 2024/0253545 A1* | 8/2024 | Lee | .......................... B60N 2/78 |

FOREIGN PATENT DOCUMENTS

| DE | 102017221460 A1 | * | 5/2019 | ........... E05C 19/166 |
| DE | 102021115147 A1 | * | 12/2022 | ............... E05F 7/04 |
| FR | 2942177 A1 | * | 8/2010 | ............... B60J 5/10 |
| GB | 908695 A | * | 10/1962 | ........... E05B 47/026 |
| KR | 102111495 B1 | * | 6/2020 | ............. E05B 77/54 |
| KR | 20210079926 A | * | 6/2021 | ............. E05B 83/18 |

* cited by examiner

ACOUSTIC IMPROVEMENTS IN VEHICLE USING ELECTROMAGNETICALLY LATCHED LIFTGATE

INTRODUCTION

The subject disclosure relates to noise, vibration and harshness (NVH) in automobiles. More particularly, interior cabin sound pressure levels may include various sources and inputs including, for example, powertrain induced noise (e.g., drivetrain/exhaust system/electric motor and inverter), chassis and suspension induced noise (e.g., road/tire noise), wind noise and other ambient, externally originating noise.

Certain vehicles may be susceptible to noise reinforcement due in part to cabin construction. For example, sport utility vehicles, crossover vehicles, passenger mini-vans and cargo vans may include interior volume spaces and geometries defining acoustic cavities predisposed to standing waves/resonance at certain primary and harmonic low frequencies, typically in vehicle longitudinal modes. In such vehicles, even relatively small excitation forces may result in objectionable acoustic "booming" as is known in the art. Vehicle panel or cabin closure flexing or movement may provide primary excitations or may significantly reinforce such noise. Liftgates, tailgates, doors, panels or other hinged or otherwise moveable features may have degrees of freedom in flexing and movement in excess of fixed panels and features.

Vehicle NVH engineers may expend significant resources and deploy various solutions to address interior cabin noise. Active noise control and psychoacoustic techniques using transducers such as those used for infotainment may be employed for noise cancellation; however, low frequency noise may require substantial acoustic energy for cancelation and localized cancelation techniques may be position limited, thus less than optimally effective for all seating positions and occupants. Sheet metal and structural features may be employed to stiffen panels; however, such features may not be sufficient or aesthetically acceptable where exposed to view. Absorptive materials may be integrated within the vehicle cabin or in panel cavities; however, such techniques may be primarily effective against external noise intrusion. Vehicle system tuning may be done to address excitation frequencies, for example internal combustion engine exhaust notes, electric vehicle power inverter frequency, or vehicle component stiffness and spring rates may be adapted to avoid certain frequencies; however, such techniques may severely compromise desired vehicle characteristics, may change over time and may limit flexibility of user selectable suspension and handling modes. In the case of liftgates and the like, tuned vibration absorbers (TVA) or dead mass may be added to mitigate booming; however, booming frequency and energy dictate that substantial mass be added which is undesirable. Moreover, TVAs may frequency shift over time due to loss of elasticity and stiffness increases due to elastomeric components and mounts in such solutions.

SUMMARY

In one exemplary embodiment, a system for attenuating low frequency acoustic noise in a cabin of a vehicle may include a liftgate, at least one hinged attachment of the liftgate to the vehicle, a mechanical latch securing the liftgate in a closed position, at least one selectively engageable electromagnetic latch effective in an energized state to attract the liftgate toward the vehicle to constrain liftgate displacement when the liftgate is in the closed position, a control module responsive to a plurality of inputs for controlling the electromagnetic latch in one of the energized state and a deenergized state.

In addition to one or more of the features described herein, the system may further include a D-ring wherein the D-ring includes an upper rail, a lower rail, a left D-pillar and a right D-pillar, wherein the at least one hinged attachment couples the liftgate to the upper rail and the mechanical latch securing the liftgate in the closed position is located at the lower rail.

In addition to one or more of the features described herein, the at least one selectively engageable electromagnetic latch may be located between the upper rail and the lower rail along one of the left D-pillar and the right D-pillar.

In addition to one or more of the features described herein, the at least one selectively engageable electromagnetic latch may include a first selectively engageable electromagnetic latch located between the upper rail and the lower rail along the left D-pillar and a second selectively engageable electromagnetic latch located between the upper rail and the lower rail along the right D-pillar.

In addition to one or more of the features described herein, the at least one selectively engageable electromagnetic latch may be located between the left D-pillar and the right D-pillar along the lower rail.

In addition to one or more of the features described herein, the selectively engageable electromagnetic latch may include an electromagnet and a magnetic mass.

In addition to one or more of the features described herein, the plurality of inputs for controlling the electromagnetic latch in one of the energized state and the deenergized state may include a plurality of enabling inputs and at least one disabling input.

In addition to one or more of the features described herein, the disabling input may include an indication of a collision event.

In addition to one or more of the features described herein, the disabling input may include an indication of an incipient collision event.

In addition to one or more of the features described herein, the plurality of enabling inputs may include an active propulsion condition, a gear direction condition, and a vehicle motion condition.

In another exemplary embodiment, a method for attenuating low frequency acoustic noise in a vehicle cabin may include monitoring a plurality of vehicle operating conditions, and based upon the vehicle operating conditions, energizing at least one electromagnetic latch to constrain acoustic reinforcing or exciting motions of a moveable panel that is in a closed position.

In addition to one or more of the features described herein, the plurality of vehicle operating conditions may include an active propulsion condition, a gear direction condition, and a vehicle motion condition.

In addition to one or more of the features described herein, the method may further include deenergizing the at least one electromagnetic latch in response to a collision event.

In addition to one or more of the features described herein, the method may further include deenergizing the at least one electromagnetic latch in response to an incipient collision event.

In addition to one or more of the features described herein, the movable panel may include a hinged liftgate.

In yet another exemplary embodiment, a vehicle may include a unibody structure including a D-ring defining a rear opening into a cabin of the vehicle, a liftgate hingedly attached to the vehicle at the D-ring, a mechanical latch securing the liftgate to the D-ring in a closed position, and at least one selectively engageable electromagnetic latch effective in an energized state to attract the liftgate toward the D-ring to constrain liftgate displacement when the liftgate is in the closed position.

In addition to one or more of the features described herein, the vehicle may further include a control module responsive to a plurality of vehicle operating conditions for controlling the electromagnetic latch in one of the energized state and a deenergized state.

In addition to one or more of the features described herein, the D-ring may include an upper rail, a lower rail, a left D-pillar and a right D-pillar, wherein the liftgate is attached to the upper rail and the mechanical latch securing the liftgate to the D-ring in the closed position is located at the lower rail.

In addition to one or more of the features described herein, the at least one selectively engageable electromagnetic latch may include a first selectively engageable electromagnetic latch located between the upper rail and the lower rail along the left D-pillar and a second selectively engageable electromagnetic latch located between the upper rail and the lower rail along the right D-pillar.

In addition to one or more of the features described herein, the at least one selectively engageable electromagnetic latch is located between the left D-pillar and the right D-pillar along the lower rail.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
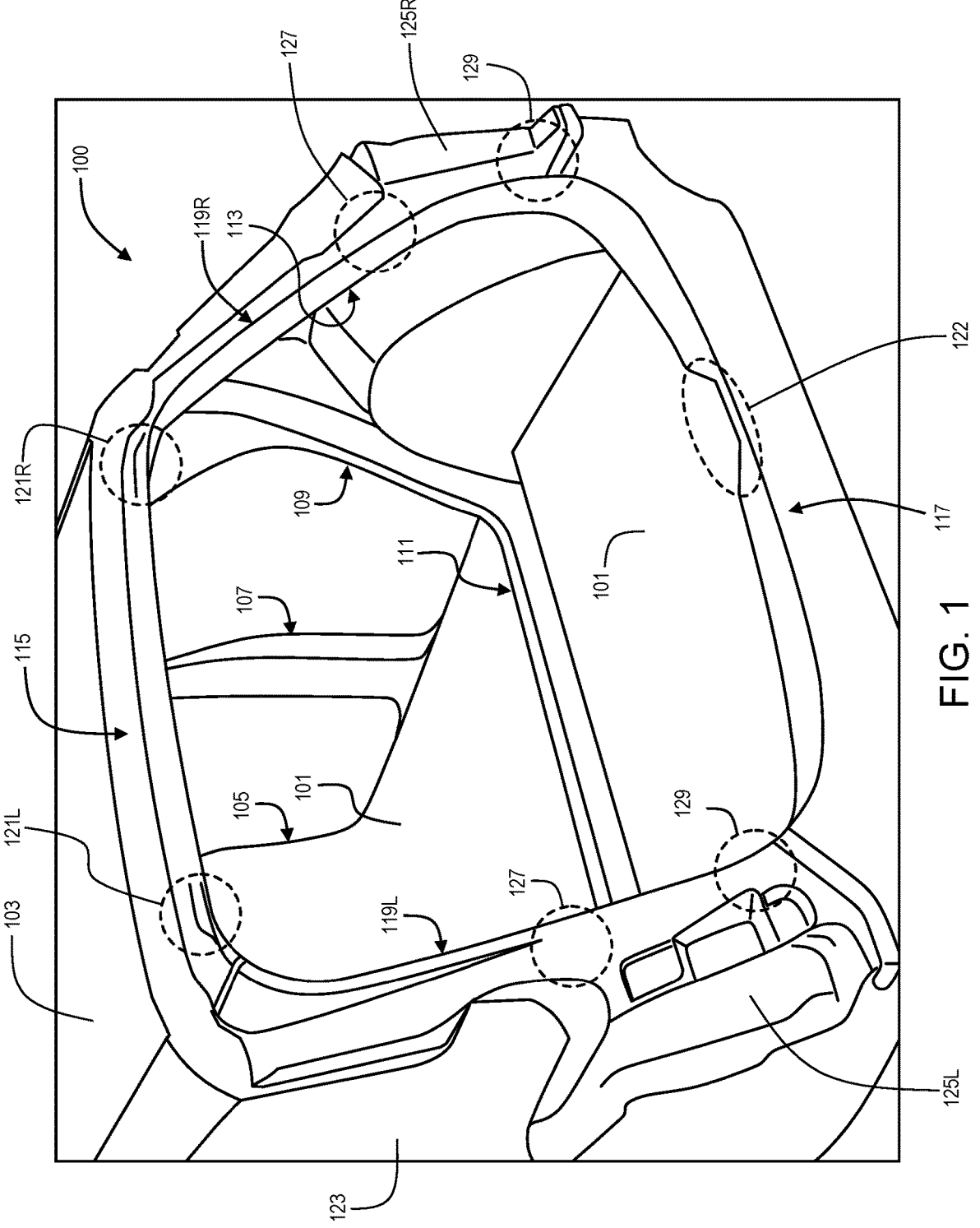
FIG. 1 illustrates a three-dimension depiction of a rear-view of an exemplary vehicle, in accordance with one or more embodiments.

The following description is merely exemplary in nature and is not intended to limit the present disclosure, its application or uses. Throughout the drawings, corresponding reference numerals indicate like or corresponding parts and features.

Objectionable low-frequency acoustic noise or booming may be attenuated in vehicles having a liftgate, tailgate, doors or other hinged or otherwise moveable features exhibiting degrees of freedom in flexing and movement in excess of fixed panels. Low-frequency acoustic noise generally includes frequencies below about 100 Hz. As used herein, liftgate shall mean any liftgate, tailgate, hatchback, door, widow or other hinged or otherwise moveable features or panels providing a passage from the interior of a vehicle to the exterior of the vehicle, for ingress or egress of persons or cargo, for ventilation, extended cargo capacity or any other purpose including merely aesthetic purposes. In an embodiment, one or more non-mechanical latches may be employed at one or more locations associated with such a liftgate such that acoustic reinforcing or exciting motions or displacements of the liftgate are constrained. Constraint of such movements may include limiting local flexing of the liftgate or limiting swing or articulation of the liftgate relative to hinge attachments. Hinge attachments as used herein means any simple or complex jointed or flexible, fixed or displaceable, single or multiplane, attachment of the liftgate to another portion of the vehicle designed for pivotal or other articulated movement of the liftgate relative to the vehicle.

FIG. 1 is a three-dimensional, rear-view depiction of an exemplary vehicle 100. The vehicle 100 may be a four side-door unibody construction of steel and other material including a floor structure 101, a roof structure 103, a right side A-pillar 105, a right side B-pillar 107 and a right side C-pillar 109. Left side pillars are not separately illustrated in the view of FIG. 1. The vehicle may include lateral rails 111. The A-pillar 105, the B-pillar 107 and the C-pillar 109 run generally from the floor structure 101 to and in support of the roof structure 103. A D-ring 113 generally defines a rear opening and includes an upper rail 115, a lower rail 117, a left D-pillar 119L and a right D-pillar 119R. The upper rail 115 is substantially transverse across the rear of the roof structure 103 at a liftgate opening. The opposing lower rail 117 is substantially transverse across the rear of the floor structure 101 at the liftgate opening. The D-pillars 119L and 119R generally run between the upper rail 115 and the lower rail 117 at outer positions near lateral limits of the liftgate opening. Also depicted in FIG. 1 are liftgate hinge attachment areas 121L and 121R on the upper rail 115 and a mechanical latch area 122 laterally central on the lower rail 117. For additional context, a left rear finish side panel 123 is illustrated as are left and right taillamp assembly wells 125L and 125R, respectively. The D-ring 113, including the upper rail 115, lower rail 117 and left and right D-pillars 119L and 119R generally may be tubular and fabricated from welded steel stampings, hydroformed steel tubes or other steel components. The D-ring 113, including the rail and pillar components, may generally be hollow and closed; however, various areas of the D-pillars 119L and 119R may include openings and/or recesses to provide mounting access for components, including electromagnetic latch components, as described further herein. For example, in one embodiment, a first set of openings in the D-pillars 119L and 119R may be located in a first region 127 centrally relative to the overall length of the D-pillars 119L and 119R, for example somewhere within about the middle one-third of the D-pillars 119L and 119R, though such placement is exemplary and not limiting. In another embodiment, a second set of openings in the D-pillars 119L and 119R may be located in a second region 129 more remotely from the upper rail 115 of the D-ring 113 and closer to the lower rail 117 of the D-ring 113, though such placement is exemplary and not limiting.

Figure 2:
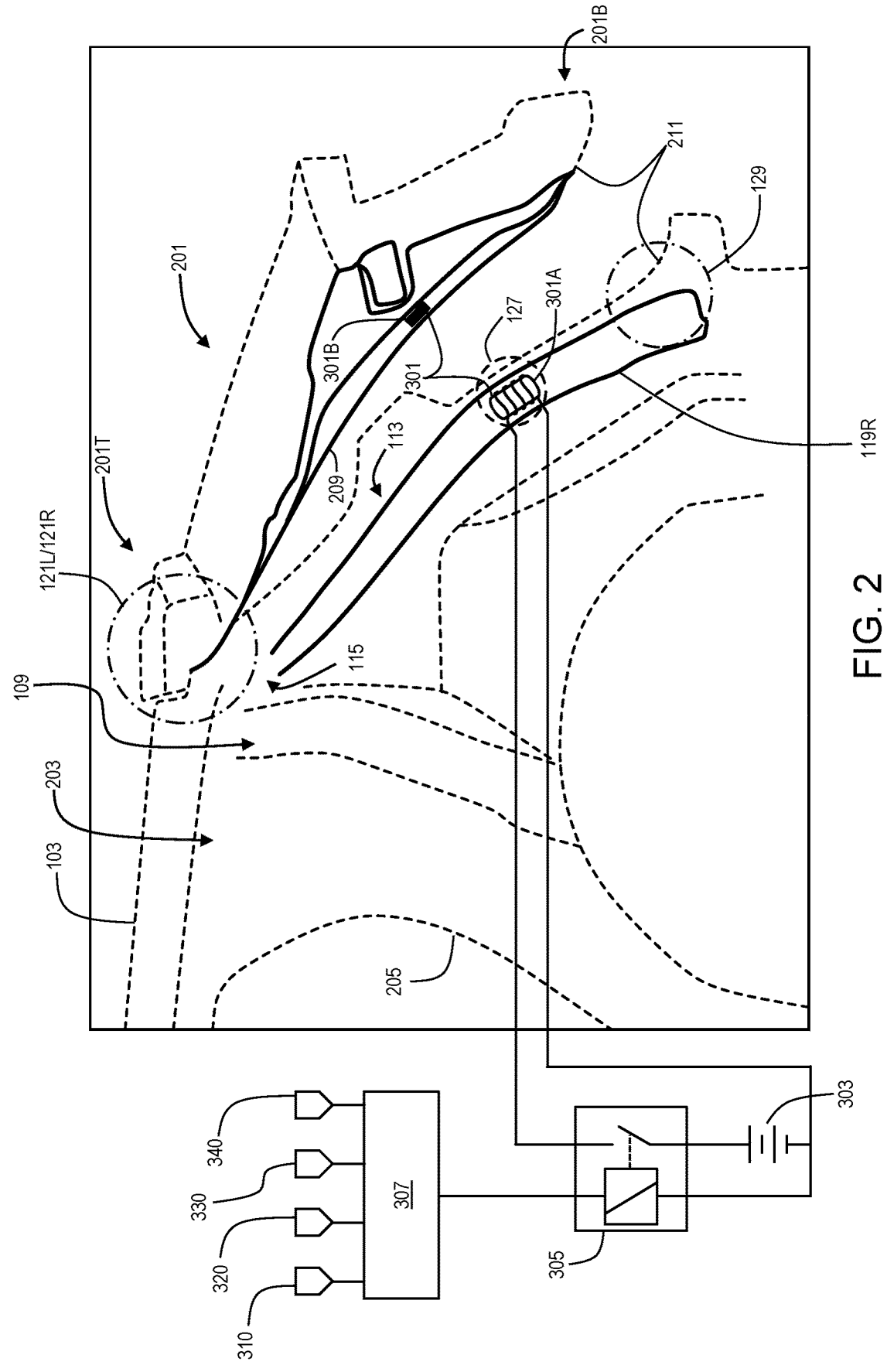
FIG. 2 illustrates a partial sectional depiction of a portion of a vehicle including a liftgate and control, in accordance with one or more embodiments.

FIG. 2 is a partial sectional depiction of a right, rear portion of the vehicle 100 shown in FIG. 1 including a liftgate 201 in a partially open position. Continued reference may be made to FIG. 1 in conjunction with the description of FIG. 2. A similar left, rear portion of the vehicle is not shown but it is understood that such a substantially equivalent left, rear portion exists and the description herein of the right, rear portion may also describe the left, rear portion. A right side panel 203 is shown in the area including the roof structure 103, a rear side door opening 205, the C-pillar 109 and the D-ring 113. The right D-pillar 119R is depicted in section and the liftgate 201 is also depicted in section along the same plane as the section through the right D-pillar 119R. Non-sectioned features of the liftgate 201 may be shown in dashed phantom outlines for context. The liftgate 201 may be hingedly attached at its top 201T near respective hinged, upper corners to liftgate hinge attachment areas 121L and 121R on the upper rail 115. A mechanical latch 211 may include a striker on one of the liftgate 201 at its bottom 201B and the lower rail 117 (FIG. 1) and a cooperative latch mechanism on the other of the liftgate 201 at its bottom 201B and the lower rail 117 (FIG. 1). The liftgate 201 may, in a fully closed position (not shown), be mechanically latched via the cooperative interaction of the striker and latch mechanisms of the mechanical latch 211. The liftgate 201 may include an inner panel 209 which, in the closed position, is the most proximate panel to the right D-pillar 119R at the rear opening. The inner panel 209 in this region at the rear opening may be formed with structural features, for example being semi-tubular at or near the perimeter of the liftgate where it interfaces with the D-ring 113. By way of non-limiting examples, the liftgate 201 may be fabricated from steel, aluminum, other metals and alloys, composite material including glass, carbon or other fiber fills, or other sheet, injection molded or vacuum formed panels and components. The D-ring 113 may include an attached weather seal (not shown) on the surface facing the inner panel 209 of the liftgate 201 which may be semi-compressed when the liftgate 201 is in the closed position and the mechanical latch 211 is in a mechanically latched state. The D-ring 113 may include compressive bumpers or standoffs for absorbing closure forces and providing some outward bias against the inner panel 209 of the liftgate 201. Such bumpers may be mounted on, and located near the lower corners of, the D-ring (e.g., second regions 129 (FIG. 1)) or mounted on, and mounted near the corresponding non-hinged, lower corners of, the liftgate 201.

In an embodiment, an electromagnetic latch 301 may include an electromagnet 301A (e.g., electrical coil surrounding a magnetic core such as iron or steel) and a magnetic mass 301B (e.g., iron or steel). The electromagnet 301A may be potted to protect against environmental degradation. The electromagnet 301A may be mounted proximate to the right D-pillar 119R for magnetic interaction with the magnetic mass 301B which is integrated with or otherwise mounted to the liftgate 201. In an embodiment, the positions of the electromagnet 301A and the magnetic mass 301B may be transposed such that the electromagnet 301A may be integrated with or otherwise mounted to the liftgate 201 for magnetic interaction with the magnetic mass 301B which is integrated with or otherwise mounted proximate to the right D-pillar 119R. In embodiments, the electromagnet 301A is recessed within an aperture or pocket formed in the right D-pillar 119R and may be substantially flush with an outer surface of the D-pillar directly opposing the inner panel 209 of the liftgate 201. Substantially flush means at, below or above the outer surface of the D-pillar without impinging upon the inner panel 209 of the liftgate 201 when the electromagnet 301A is actuated and close enough for effective magnetic interaction with the magnetic mass 301B. In an embodiment, the magnetic mass 301B may be the inner panel 209 of the liftgate (electromagnet 301A located with the right D-pillar) or the magnetic mass 301B may be the right D-pillar 119R (electromagnet located with the liftgate 201) in the case where the inner panel 209 or right D-pillar is magnetic steel. In another embodiment, the magnetic mass 301B may be a blank or plate of magnetic steel or iron located with the liftgate 201 for magnetic interaction with the electromagnet 301A located with the right D-pillar 119R. In an embodiment, the magnetic mass 301B may be a blank or plate of magnetic steel or iron mounted behind the inner panel 209 of the liftgate 201 such that the inner panel 209 is intermediate the magnetic mass 301B and the electromagnet 301A.

In one embodiment suitable for addressing undesirable flexing of the liftgate 201, for example flexing between the liftgate hinge attachment area 121R at the upper rail 115 of the D-ring 113 and the mechanical latch 211 at the lower rail 117 (FIG. 1) of the D-ring 113, or between the liftgate hinge attachment area 121R at the upper rail 115 of the D-ring 113 and a bumper at the adjacent non-hinged corner of the liftgate 201. Such flexing may be suppressed by locating one electromagnetic latch 301 centrally intermediate along the length of the right D-pillar 119R (e.g., first region 127 centrally relative to the overall length of the D-pillar 119R). A second electromagnetic latch 301 may also be similarly located at the left D-pillar 119L though not shown in the view of FIG. 2. Electromagnetic latches 301 may thus provide additional anchor points or nodes intermediate the liftgate hinge attachment areas 121L and 121R and the mechanical latch 211 or bumpers.

In one embodiment suitable for addressing undesirable pumping action of the liftgate 201 due to rotation of the liftgate 201 at the liftgate hinge attachment areas 121L and 121R (and motion against the compressive seal), motion may be suppressed by locating the electromagnetic latch 301 more remotely from the upper rail 115 of the D-ring 113 and closer to the lower rail 117 (FIG. 1) of the D-ring 113 thereby suppressing rotational motion of the entire liftgate 201 as a unit about the liftgate hinge attachment areas 121L and 121R. In such arrangements, the electromagnetic latches 301 may be located proximate to the lower corners of the D-ring 113 along either the D-pillars or the lower rail 117 (e.g., second regions 129). The electromagnetic latches 301 may thus provide additional anchor points or nodes intermediate the liftgate hinge attachment areas 121L and 121R and the mechanical latch 211 at the non-hinged corners of the liftgate 201.

Electrical energization of the electromagnet 301A may be by a low voltage source such as a 12 volt battery 303 used for servicing vehicle auxiliary loads. The electromagnet 301A may be selectively energized through the controllable contacts of an electromechanical relay 305. In other embodiments the relay switching function may be by way of a solid state relay or switch. A control module 307 such as a body control module (BCM) may have primary authority of the control state of the electromagnet 301A and hence of the state of the electromagnetic latch 301. A plurality of enabling and/or disabling inputs or vehicle operating conditions may be provided to the control module 307 and used in determining the commanded state of the relay 305 and hence the state of the electromagnetic latch 301. For example, a vehicle running condition such as an active propulsion condition 310, a gear direction condition 320 and a vehicle motion condition 330 may be evaluated to determine whether the relay 305 is commanded on to enable the electromagnetic latch 301. Fewer or additional inputs or conditions may be provided. In an embodiment, the condition 310 may be provided by a powertrain control module, engine control module, and electric propulsion control module or other as an indication of the vehicle being in a "run" state or a propulsion mode. In an embodiment, the condition 320 may be provided by a transmission control module, a powertrain control module, an electric propulsion control module or other as an indication of the vehicle being in a forward gear state. In an embodiment, the condition 330 may be provided by a transmission control module, a powertrain control module, an electric propulsion control module, a velocity sensor including global positioning system (GPS) based or other as an indication of the vehicle moving forward. All or some of the conditions 310, 320 and 330 may also be obtained via bus data readily available for example on a controller area network (CAN) bus or similar communication bus. One or more disabling inputs or conditions 340 may be provided or obtained by the control module 307 and used in determining the commanded state of the relay 305 and hence the state of the electromagnetic latch 301. For example, inertial or other sensors may provide information of an actual or incipient collision indicating the desirability of disabling the electromagnetic latch 301 in response to a collision event or in preparation for a collision event. Deactivation of the electromagnetic latch 301 upon a sensed impact or in preparation for an incipient impact for example through inertial sensor inputs or inflatable restraint controls or activations may be desirable for reasons of enabling ingress and egress in the event of a collision and to disable non-mechanical latching mechanism.

As used herein, electronic control unit (ECU), control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, and in-plant and service-related networks including for over the air (OTA) software updates. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module may have a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

Figure 3:
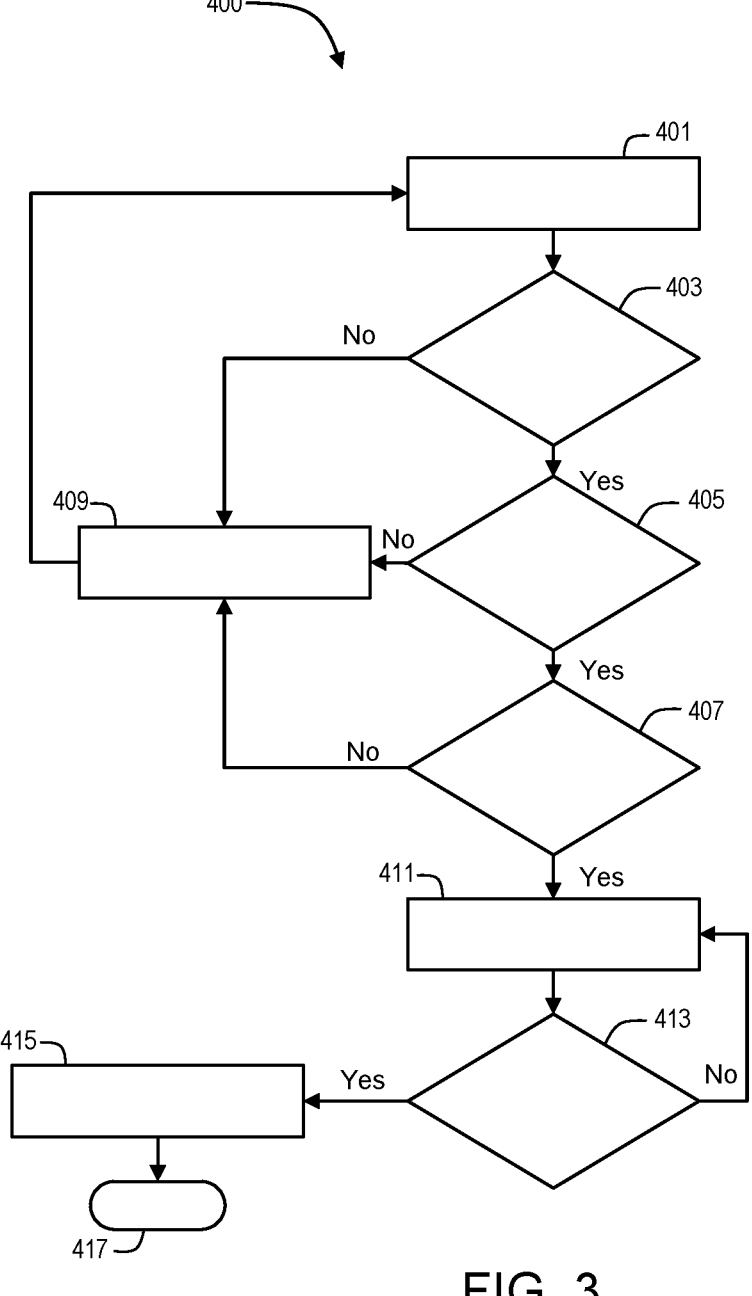
FIG. 3 illustrates a routine for control of a magnetically latched liftgate, in accordance with one or more embodiments.

FIG. 3 illustrates a routine 400 representing exemplary tasks which may be executed in software instruction sets in one or more control modules such as the control module 307 of FIG. 2 in carrying out an exemplary control of an electromagnetically latched liftgate as described herein. The routine may begin at 401 which may initialize the routine through data acquisition of, for example, various inputs and conditions such as those described as enabling conditions

310, 320 and 330 and disabling conditions 340. In an internal combustion vehicle, block 403 may determine whether the engine is running and if not then the electromagnetic latching of the liftgate is disabled at 409. When the engine is running, the gear condition is checked at 405 and if not in a forward gear state then the electromagnetic latching of the liftgate is disabled at 409. When the gear condition is in a forward gear state, the vehicle motion condition is checked at 407 and if not moving forward then the electromagnetic latching of the liftgate is disabled at 409. When the vehicle motion is forward, the electromagnetic latch is commanded on and the liftgate is electromagnetically latched at 411. A collision condition is checked at 413 and where there is no collision indicated, the electromagnetic latch remains commanded on and the liftgate electromagnetically latched at 411. When a collision is indicated, then the electromagnetic latching of the liftgate is disabled at 415 and the routine exited at 417. Disablement of the electromagnetic latching of the liftgate at 409 returns control to 401 renewed invocation of the routine.

The terminology used herein is for the purpose of describing particular embodiments only and is not intended to be limiting. The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for attenuating low frequency acoustic noise in a cabin of a vehicle, comprising:
   a liftgate;
   at least one hinged attachment of the liftgate to the vehicle;
   a mechanical latch securing the liftgate in a closed position;
   at least one selectively engageable electromagnetic latch effective in an energized state to attract the liftgate toward the vehicle to constrain liftgate displacement when the liftgate is in the closed position; and
   a control module responsive to a plurality of inputs for controlling the electromagnetic latch in one of the energized state and a deenergized state,
   wherein the selectively engageable electromagnetic latch comprises an electromagnet and a magnetic mass, the magnetic mass being mounted behind an inner panel of the liftgate such that the inner panel is intermediate the magnetic mass and the electromagnet.

2. The system of claim 1 further comprising a D-ring wherein the D-ring includes an upper rail, a lower rail, a left D-pillar and a right D-pillar, wherein the at least one hinged attachment couples the liftgate to the upper rail and the mechanical latch securing the liftgate in the closed position is located at the lower rail.

3. The system of claim 2 wherein the at least one selectively engageable electromagnetic latch is located between the upper rail and the lower rail along one of the left D-pillar and the right D-pillar.

4. The system of claim 2 wherein the at least one selectively engageable electromagnetic latch comprises a first selectively engageable electromagnetic latch located between the upper rail and the lower rail along the left D-pillar and a second selectively engageable electromagnetic latch located between the upper rail and the lower rail along the right D-pillar.

5. The system of claim 2 wherein the at least one selectively engageable electromagnetic latch is located between the left D-pillar and the right D-pillar along the lower rail.

6. The system of claim 1 wherein the plurality of inputs for controlling the electromagnetic latch in one of the energized state and the deenergized state comprises a plurality of enabling inputs and at least one disabling input.

7. The system of claim 6 wherein the at least one disabling input comprises an indication of a collision event.

8. The system of claim 6 wherein the at least one disabling input comprises an indication of an incipient collision event.

9. The system of claim 6 wherein the plurality of enabling inputs comprise an active propulsion condition, a gear direction condition, and a vehicle motion condition.

10. A method for attenuating low frequency acoustic noise in a vehicle cabin, comprising:
    monitoring a plurality of vehicle operating conditions; and
    based upon the vehicle operating conditions, energizing at least one electromagnetic latch to constrain acoustic reinforcing or exciting motions of a liftgate that is in a closed position,
    wherein the at least one electromagnetic latch comprises an electromagnet and a magnetic mass, the magnetic mass being mounted behind an inner panel of the liftgate such that the inner panel is intermediate the magnetic mass and the electromagnet, and
    wherein the electromagnet latch is selectively energized through controllable contacts of an electromechanical relay electrically disposed between a control module and the electromagnetic latch.

11. The method of claim 10 wherein the plurality of vehicle operating conditions comprises an active propulsion condition, a gear direction condition, and a vehicle motion condition.

12. The method of claim 10 further comprising deenergizing the at least one electromagnetic latch in response to a collision event.

13. The method of claim 10 further comprising deenergizing the at least one electromagnetic latch in response to an incipient collision event.

14. The method of claim 10 wherein the liftgate comprises a hinged liftgate hingedly attached to the vehicle.

15. A vehicle, comprising:
    a unibody structure including a D-ring defining a rear opening into a cabin of the vehicle;
    a liftgate hingedly attached to the vehicle at the D-ring;
    a mechanical latch securing the liftgate to the D-ring in a closed position; and
    at least one selectively engageable electromagnetic latch effective in an energized state to attract the liftgate toward the D-ring to constrain liftgate displacement when the liftgate is in the closed position,
    wherein the electromagnet latch is selectively energized through controllable contacts of an electromechanical relay electrically disposed between a control module and the electromagnetic latch, and
    wherein the selectively engageable electromagnetic latch comprises an electromagnet and a magnetic mass, the magnetic mass being mounted behind an inner panel of the liftgate such that the inner panel is intermediate the magnetic mass and the electromagnet.

16. The vehicle of claim 15 further comprising the control module responsive to a plurality of vehicle operating conditions for controlling the electromagnetic latch in one of the energized state and a deenergized state.

17. The vehicle of claim 15 wherein the D-ring includes an upper rail, a lower rail, a left D-pillar and a right D-pillar, wherein the liftgate is attached to the upper rail and the mechanical latch securing the liftgate to the D-ring in the closed position is located at the lower rail.

18. The vehicle of claim 17 wherein the at least one selectively engageable electromagnetic latch comprises a first selectively engageable electromagnetic latch located between the upper rail and the lower rail along the left D-pillar and a second selectively engageable electromagnetic latch located between the upper rail and the lower rail along the right D-pillar.

19. The vehicle of claim 17 wherein the at least one selectively engageable electromagnetic latch is located between the left D-pillar and the right D-pillar along the lower rail.

20. The system of claim 1, wherein the magnetic mass is magnetic iron.

\* \* \* \* \*